United States Patent [19]

Maruyama et al.

[11] Patent Number: 5,008,297

[45] Date of Patent: Apr. 16, 1991

[54] METHOD FOR PRODUCING PHENOL RESIN FOAMS AND METHOD OF MAKING FOAMED LAMINATES

[75] Inventors: Akihiro Maruyama; Munehiko Kato; Takumi Ishiwaka; Katsuto Seki; Takashi Ohashi, all of Yokohama, Japan

[73] Assignee: Bridgestone Corporation, Tokyo, Japan

[21] Appl. No.: 356,945

[22] Filed: May 25, 1989

[30] Foreign Application Priority Data

May 27, 1988 [JP] Japan ................................. 63-129987
May 27, 1988 [JP] Japan ................................. 63-129988

[51] Int. Cl.$^5$ ............................................. C08G 18/14
[52] U.S. Cl. ...................................... 521/136; 521/181
[58] Field of Search ............................... 521/136, 181

[56] References Cited

U.S. PATENT DOCUMENTS 4,539,338 9/1985 Carlson et al. ...................... 521/181
4,694,028 9/1987 Saeki et al. .......................... 521/181

Primary Examiner—Maurice J. Welsh
Attorney, Agent, or Firm—Birch, Stewart, Kolasch & Birch

[57] ABSTRACT

In a method for producing resol type phenol resin foams by using starting material for the foams prepared by blending a resol type phenol resin, a blowing agent and a catalyst, a low molecular weight resol type phenol resin with the number average molecular weight of less than 200 and a high molecular weight resol type phenol resin with the number average molecular weight of greater than 200 are mixed at a weight ratio of from 5/95 to 80/20 and used as the resol type phenol resin. The resol type phenol resin foams are excellent in adhesion, fire-proofness capable of foaming cure in a short time and useful for sprayed-in-place foaming, etc. The phenol resin foams produced by the invention are capable of integral foaming with rigid urethane resin foam layer into foamed laminates of excellent thermal insulation, fire-proofness, etc.

7 Claims, 1 Drawing Sheet

METHOD FOR PRODUCING PHENOL RESIN FOAMS AND METHOD OF MAKING FOAMED LAMINATES

BACKGROUND OF THE INVENTION

1. Field of the Invention

The present invention relates to a method for producing phenol resin foams and also relates to a method of making composite foamed laminates comprising phenol resin foams and rigid polyurethane foams. They can be utilized suitably as heat insulating material for building structures and warm and cold water pipeways, bath tanks, etc. as well as floor base material with an aim of heat insulation or keeping air tightness in railway vehicles, etc.

2. Description of the Prior Art

As has been well-known, resol phenol resin foams are produced by admixing blowing agent, foam stabilizer and an acidic catalyst to liquid resol phenol resin under stirring thereby causing them to foam along with the progress of the resinification.

However, since the resol phenol resin foams have usually been produced by utilizing polycondensating reaction, there has been a problem that foaming cure requires a long time. Further, since the conventional resol phenol resin foams are hard and friable, the resultant foams involve drawbacks that the adhesion to various plate materials such as plywood, craft paper, plaster board, etc. or to concrete bodies is inferior.

Accordingly, it has been very difficult and lacked in practicaly to utilize the resol phenol resin foams as a substitute for rigid polyurethane foams in sprayed-in-place foaming applied so far by using rigid polyurethane foams.

On the other hand, the rigid polyurethane foams have low thermal conductivity and excellent thermal insulating property, and have been utilized generally for laminated board, etc. They are useful for sprayed-in-place foaming process.

However, the rigid polyurethane foams are easily ignited by merely brought into contact with small firing source such as welding sparks to possibly lead to fire accidents, thereby bringing about a problem in view of the fire proofness.

Although phenol resin foams which also have been suitably used as laminated boards, etc. are excellent in fire proofness, they involve a problem that the heat insulating performance is rather poor as compared with the rigid urethane foams.

In view of the above, it has been desired for foam structure having both high fire-proofness and excellent heat insulating property.

SUMMARY OF THE INVENTION

Therefore, an object of the present invention is to provide a method for producing resol phenol resin foams capable of foaming cure in a short period of time and capable of sprayed-in-place foaming with excellent adhesion to various kinds of plate materials and concrete bodies.

Another object of the present invention is to provide a method of making foamed laminates comprising phenol resin foams and rigid polyurethane foams having excellent insulating performance, as well as high fire-proofness and, accordingly, can be utilized generally for various kind of heat insulating materials.

The present inventors have made earnest studies for obtaining the foregoing objects and, as a result, have found that resol phenol resin foams with short foaming cure time and having excellent adhesion can be produced by using as the starting material a resol phenol resin mixture comprising a low molecular weight resol phenol resin with the number average molecular weight of less than 200 and a resol phenol resin of high molecular weight with the number average molecular weight of greater than 200 at a weight ratio of from 5/95 to 80/20 and, preferably, from 10/90 to 60/40 and blending it with a blowing agent and a catalyst to allow the blend to foam.

More detailedly, it has been found by the present inventors that if a high molecular weight resol phenol resin is used as the starting material for resol phenol resin foams, the adhesion of the resultant foams is remarkably improved but the concentration of active methylol groups is reduced to remarkably increase the time required for the foaming cure. It has, however, been found that by the blended use of a low molecular weight resin with the number average molecular weight of less than 200 and a high molecular weight resin with the number average molecular weight of greater than 200 at the above specific ratio as the resol phenol resin, resol phenol resin foams of high practical usefulness which are excellent in adhesion to various types of plate materials and concrete bodies, as well as capable of foaming cure in a short period of time thus enabling effective utilization in sprayed-in-place foaming, since the high molecular weight resin gives an effect as a relatively independent factor to the adhesion property of the foams, as well as the low molecular weight resin gives an effect as a curing co-catalyst.

The present inventors also have found that foamed laminates of low thermal conductivity and excellent thermal insulation, as well as having high fire-proofness and satisfactory adhesion to various kinds of plate materials, concrete bodies, etc. can be obtained by integrally foaming rigid polyurethane foams and the phenol resin foams described above and that such foamed laminates can generally be utilized as heat insulators, floor base materials, etc. when foamed and bonded on various kinds of plate materials or concrete bodies. Particularly, although the conventional phenol foams require a long time for foaming cure and are relatively difficult for sprayed-in-place foaming, the resol phenol resin mixture comprising a low molecular weight resol phenol resin with the number average molecular weight of less than 200 and a high molecular weight resol phenol resin with the number average molecular weight of greater than 200 at a weight ratio of from 5/95 to 80/20 as the starting material for the phenol forms, enables foaming cure in a short period of time, can facilitate sprayed-in-place foaming and provide integral foaming with satisfactory adhesion on the rigid urethane foams cured in the same manner by sprayed-in-place foaming.

Accordingly, the present invention provides a method for producing a resol phenol resin foam by blending a resol phenol resin, a blowing agent and a catalyst and foaming the blend, characterized in that said phenol resin comprises a mixture of a low molecular weight resol phenol resin with the number average molecular weight of less than 200 and a high molecular weight resol phenol resin with the number average molecular weight of greater than 200 are mixed at a weight ratio of from 5/95 to 80/20.

The present invention also provides a method of making a foamed laminate, comprising a rigid polyurethane foam and a phenol resin foam, characterized in that a resol phenol resin mixture comprising a low molecular weight resol type phenol resin with the number average molecular weight of less than 200 and a high molecular weight resol type phenol resin with the number average molecular weight of greater than 200 at a weight ratio of from 5/95 to 80/20 is used as the starting material for the resol phenol resin foam and is blended with a blowing agent and a catalyst to foam the blend integrally on the rigid polyurethane foam.

The above and other objects, features and advantages of the present invention will be more apparent from the following description.

DETAILED DESCRIPTION OF THE INVENTION

Figure 1:
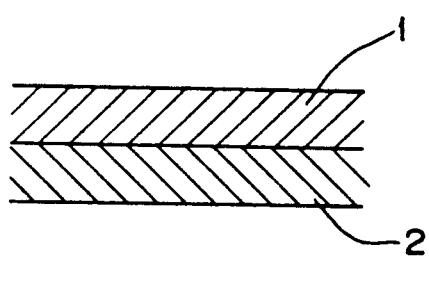
FIGS. 1 through 4 are, respectively, cross sectional views illustrating examples of laminates made by the method of making the foamed laminates according to the present invention.

In the method for producing the resol phenol resin foams and a method of making foamed laminates according to the present invention, starting materials for the phenol resin foams are prepared by blending a resol phenol resin, a blowing agent and a catalyst.

In the present invention, various resol phenol resins can be used so long as they are suitable to the field and the purpose for the synthesis of phenol resins and they may be used alone or in admixture with two or more of them. In this case, the preferred resol phenol resin includes those liquid phenol resins containing methylol groups such as phenol formaldehyde resin, phenol furfural resin, cresol formaldehyde resin and cresol furfural resin obtained by reacting phenol, cresol, etc. with formaldehyde, furfural, etc. under the presence of an alkaline catalyst.

Among the various kinds of resol phenol resins, phenol formaldehyde resin has often been used since the reaction rate between phenol and formaldehyde is fast and it can provide an economical advantage of shortening the synthesis time, and such phenol formaldehyde resin can more preferably be used.

There is no particular restriction for the viscosity of the resol phenol resin, although the resol phenol resin should preferably have a viscosity of 2000 to 20000 centipoises, more preferably 2000 to 5000 centipoises, for low molecular weight resol resin, and more preferably 9000 to 15000 centipoises for high molecular weight resol resin at 25° C.

In the present invention, a low molecular weight resol phenol resin and a high molecular weight resol phenol resin are used in combination as the resol phenol resin. As the low molecular weight resin, the resol phenol resin with the number average molecular weight of less than 200, preferably, from 150 to 180 is used, whereas the resol phenol resin with the number average molecular weight of greater than 200, preferably, from 250 to 450, more preferably, 280 to 380 is used as the high molecular weight resin. It is important for the object of the present invention to use the low molecular weight resin and the high molecular weight resin, with the number average molecular weight for each of them being within the range as described above. On the other hand, if only the low molecular weight resin or the high molecular weight resin is used alone, the reduction will be caused to the adhesion of the foams or it will take a long time for the foaming cure.

The low molecular weight resin and the high molecular weight resin are blended at a weight ratio from 5/95 to 80/20, preferably, from 10/90 to 60/40, more preferably, from 20/80 to 60/40. If the mixing ratio between both of the resins is less than 5/95, the viscosity of the resol phenol resin mixture is increased, and the foaming cure reaction is retarded although the adhesion between the resultant foams and the plate material or concrete bodies is satisfactory. On the other hand, if the mixing ratio exceeds 80/20, the adhesion becomes poor although the time for the foaming cure reaction is short. Accordingly, the practical usefulness of the foams is poor in both of the cases.

Various blowing agents are used so long as it is used usually as the starting material for the phenol resin foams. For example, there may be used chlorinated hydrocarbon such as chloroform or methylene chloride, chlorofluorinated hydrocarbon compounds such as trichlorofluoromethane, 1,1,2-trichloro-1,2,2-trifluoroethane, monochlorodifluoromethane, dichlorodifluoro-methane, 1,1-dichloro-1,2,2,2-tetrafluoroethane, 1,2-dichloro-1,1,2,2-tetrafluoroethane, 1,1,1-trichloro-2,2,2-trifluoroethane, 1,2-difluoro-ethane, 1,1,2,2-tetrachloro-1,2-difluoroethane, 1,1,2,2-tetrachloro-2,2-difluoroethane. They are used alone or as a mixture of two or more of them. The amount of the blowing agent may be in the range of 5 to 50 parts, preferably 10 to 30 parts by weight for 100 parts by weight of the resol phenol resin.

As the catalyst, those mineral acids or organic acids used generally as the catalyst for phenol resin polymerization can be used suitably. Examples of mineral acids include sulfuric acid, hydrochloric acid or phosphoric acid, and examples of organic acids include p-toluene sulfonic acid, xylene sulfonic acid and phenol sulfonic acid. There is no particular restrictions also for the blending amount of the catalyst and usual blending amount may be used, although the amount of the catalyst may be in the range of 5 to 70 parts, preferably 10 to 50 parts by weight for 100 parts by weight of the resol phenol resin.

In the present invention, foam stabilizer is desirably blended as the starting material for the phenol resin foams and the foam stabilizers used are, for example, polysiloxane compounds, castor oil ethylene oxide adducts and polyoxyethylene sorbitan fatty acids. The amount of the foam stabilizer may be in the range of 1 to 10 parts, preferably 2 to 5 parts by weight for 100 parts by weigh of the resol phenol resin.

Furthermore, optional ingredients other than the foam stabilizer may be blended with no troubles as the starting material for the phenol resin foams so long as they do not hinder the purpose of the present invention.

When the resol phenol resin foams are prepared from the starting material, usual method employed for forming the phenol resin foams can be used. For example, foams can be obtained by mixing resol phenol resin mixture of both high molecular weight and low molecular weight with a foam stabilizer, admixing a blowing agent and the applying violent stirring at a room temperature with addition of catalyst.

There is no particular restriction for the kind of the rigid polyurethane foams used for the method of making the laminates according to the present invention. Various rigid polyurethane foams obtained from usual starting materials such as polyol compound and isocyanate compound and, furthermore, catalyst, blowing agent, foam stabilizer and flame retardant are used.

As the polyol compound, it is preferred to use those compounds having two or more hydroxy groups at the terminal ends in one molecule alone or in admixture with two or more of them. Examples of the polyol compound include polyhydric alcohol alkylene oxide adduct such as ethylene glycol, propylene glycol, butylene glycol, hexylene glycol, diethylene glycol, diproylene glycol, glycerine, hexanetriol, pentaerythritol, trimethylol propane, diethanolamine, triethanolamine, methyl glucoside, sorbitol and sucrose; alkylene oxide adduct of polyamines, for example, ammonia, ethylenediamine, diethylene triamine and aromatic amine such as tolylenediamine; phosphorus-containing polyol such as alkylene oxide adduct of phosphoric acid; alkylene oxide adduct of phenols typically represented by bisphenol A; alkylene oxide adduct of intermediate product of novolak resin and resol resin having phenolic hydroxy groups.

As the isocyanate compound, there can be used, for example, 2,4-tolylene diisocyanate, 2,6-tolylene diisocyanate, diphenylmethane-4,4'-diisocyanate, diphenylether-4,4'-diisocyanate, 1,5-naphthalene diisocyanate, polymethylene polyphenylene polyisocyanate, etc., crude diphenylmethane-4,4'-diisocyanate being used preferably.

The blending ratio between the polyol compound and the isocyanate compound may be a usual blending ratio and it is preferred to blend both of the compounds such that the index value representing the ratio between the polyol compound and the isocyanate compound is from 95 to 115. However, an excess amount of the isocyanate compound may be blended such that the index value exceeds the above-mentioned range.

Furthermore, as the catalyst for producing a rigid polyurethane foam, there can be used one or more of amine catalysts such as triethylamine, N-methylmorphorine, N-ethylmorphorine, N,N,N',N'-tetramethylethylenediamine, 1,4-diazabicyclo-(2,2,2)-octane, N-methyl-N'-dimethylaminoethyl piperadine, N,N-dimethylbenzylamine, bis(N,N-diethylaminoethyl)-adipate, N,N-diethylbenzylamine, pentamethyldiethylenetriamine, N,N-dimethylcyclohexylamine, N,N,N',N'-tetramethyl-1,3-butanediamine, N,N-dimethyl-β-phenylethylamine, 1,2-diethylimidazole and 2-methylimidazole, organic tin catalyst, for example, bivalent tin such as tin acetate, stanous octenate, tin laurate and tetravalent tin such as butyl tin oxide, dibutyl tin dichloride, dibutyl tin diacetate, dibutyl tin dilaurate, dibutyl tin maleate or dioctyl tin diacetate, further, potassium acetate, lead acetate and other organic metal compound catalyst.

As the blowing agent for producing a rigid polyurethane foam, there can be used, for example, water, gaseous carbon dioxide, trichloromonofluoro methane, methylene dichloride, pentane and air. As the foam stabilizer, polydimethylsiloxane type foam stabilizer bonded to a copolymer of ethylene oxide and propylene oxide is preferably used although the stabilizer is not restricted only thereto. As the flame retardant, there can be used those phosphorus-containing flame retardants such as tris(2-chloroethyl) phosphate, tris(2-chloropropyl) phosphate, tris(2,3-dibromopropyl) phosphate, tris(1,3-dichloro-isopropyl)phosphate, melamine powder, etc. Optional ingredients other than the ingredients as described above may be blended with no trouble as the starting material for the rigid polyurethane foams.

There are no particular restrictions for the blending amounts of the catalyst, blowing agent, foam stabilizer, flame retardant and, further, optional ingredients and they may be adjusted properly depending on the purpose of use, etc. The amount of the catalyst, blowing agent and foam stabilizer may be in the range of 0.5 to 10 parts, preferably 1 to 5 parts (catalyst), in the range of 20 to 70 parts, preferably 30 to 60 parts (blowing agent), and in the range of 0.5 to 5 parts, preferably 1 to 3 parts (foam stabilizer) by weight for 100 parts by weight of the polyol compound and the isocyanate compound, respectively.

The process for producing the rigid polyurethane foams from the starting material can be the usual production process. For instance, foams can be obtained by adding catalyst, blowing agent, foam stabilizer and flame retardant to the polyol compound and then mixing under stirring the polyol ingredient with the isocyanate compound at room temperature to foam.

In the method of making the laminates according to the present invention, the rigid polyurethane foams and the phenol resin foams are foamed integrally, and the laminates can be utilized for various plate materials such as wood material, craft paper, plaster board, etc. or as heat insulators, floor base materials, etc. by bonding and forming them on the surface of concrete bodies, etc.

In the method of making the laminates, the rigid polyurethane foams and the phenol resin foams are laminated and molded by the method of sprayed-in-place foaming, a lamination method used for preparing laminated boards or like other molding method.

In this case, upon molding by the sprayed-in-place foaming, laminates comprising rigid polyurethane foams and phenol resin foams formed by integral foaming can be obtained, for example, by spraying a mixture of starting material for rigid polyurethane foams on the surface of various plate materials, concrete bodies, etc. thereby forming a rigid polyurethane foam layer by foaming, then spraying a mixture of starting material for phenol resin foams on the rigid polyurethane foam layer by using a spray, etc. and then forming a phenol resin foam layer by foaming. In this case, if a blend comprising a mixture of a resol phenol resin prepared by mixing a low molecular weight resol phenol resin with the number average molecular weight of less than 200 and a high molecular weight resol phenol resin with the number average molecular weight of less than 200 at a weight ratio from 5/95 to 80/20, a blowing agent and a catalyst is used as the starting material for the phenol foams as described above, the blend causes foaming cure in a short period of time, sprayed-in-place foaming can be conducted efficiently and the phenol resin foam layer can be integrally laminated with satisfactory adhesion on the cured polyurethane foam.

Figure 3:
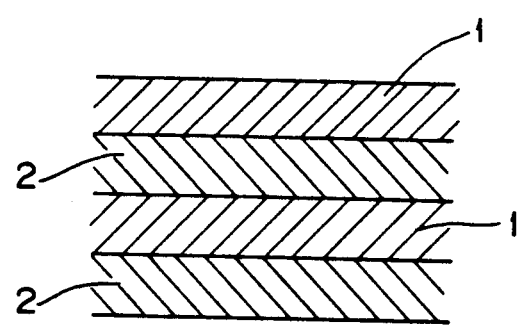
Figure 2:
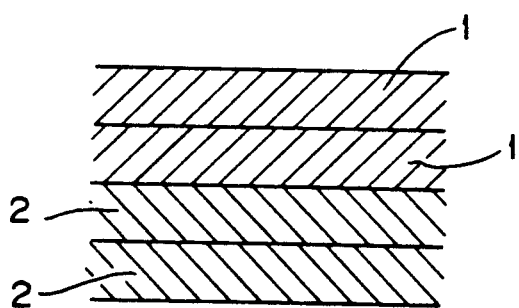
Figure 4:
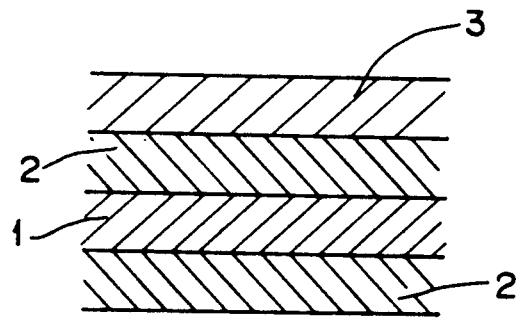

In this spraying a layer of phenol resin foams may be laminated on a layer of rigid polyurethane foam 1 as shown in FIG. 1, two layers of phenol resin foams 2,2 may be laminated on two layers of rigid polyurethane foams 1,1 successively as shown in FIG. 2, or rigid polyurethane foam 1 and phenol resin foam 2 may be alternatively laminated as shown in FIGS. 3 and 4. In this case, the phenol resin foams 2 can be foamed with satisfactory adhesion to various kinds of plate materials, concrete bodies 3, etc. even if the phenol resin foams 2 are directly spray-foamed to them as shown in FIG. 4, by using a blend comprising a resol phenol resin mixture prepared by mixing a low molecular weight resol phenol resin with the average molecular weight of less than 200 and a high molecular weight resol phenol resin with the number average molecular weight of greater than 200 at a weight ratio from 5/95 to 80/20, a blowing agent and a catalyst as the starting material for the phenol foams.

In the laminates shown in FIGS. 1-4, the phenol resin foam layer 2 is disposed on the side requiring fire-proofness since the phenol resin foams have fire-proofness. Since the laminate shown in FIG. 4 has phenol resin foams 2, 2 on both sides, it is highly fire-proof.

Molding by using the lamination method can be conducted by, for example, foaming to laminate starting material for rigid polyurethane foams to the surface of various kinds of plate materials, concrete bodies, etc., and then foaming to laminate starting material for phenol resin foams over the rigid polyurethane layer, followed by press-bonding the laminate and the plate material in a cure tunnel.

As has been explained above, by the method for producing the resol phenol resin foams according to the present invention, it is possible to produce resol phenol resin foams having excellent adhesion with various kinds of plate materials or concrete bodies and capable of foaming cure in a short period of time. Accordingly, the resol phenol resin foams obtained by the production process according to the present invention can be utilized for sprayed-in-place foaming and have high practical usefulness.

Furthermore, by the method of manufacturing laminates according to the present invention, it is possible to obtain laminates which are excellent in heat insulating performance and of high fire-proofness, and show satisfactory adhesion with various kinds of plate materials, concrete bodies etc.

The phenol resin foams and the laminates according to the present invention can be utilized generally as heat insulators for building structural materials, warm and cold water pipeways, bath tanks, etc. floor base materials for railway vehicles, etc.

The present invention is to be explained specifically referring to examples and comparative examples but the invention is not restricted only to the following examples.

In the following examples, all of "parts" mean "parts by weight".

EXAMPLES 1-4, COMPARATIVE EXAMPLES 1-5

In accordance with the blending formulation shown in Table 1, a low molecular weight resol phenol resin, a high molecular weight resol phenol resin (the resol phenol resin is hereinafter simply referred to as resol resin) and a foam stabilizer were added each in a predetermined amount and well-mixed in a paper cup of 200 cc volume, to which a predetermined amount of a blowing agent further admixed and then a predetermined amount of a catalyst were further added. They were then mixed under violent stirring for 10 sec. at a room temperature by a mixer. Then, the mixture was poured onto a veneer board and caused to react and foam at room temperature to obtain foams (Example 1-4).

For comparison, foams were prepared in the same manner as described above by using, as the resol resin, only the low molecular weight resol resin (Comparative Example 1), a mixture of two kinds of low molecular weight resol resins (Comparative Example 2), only the high molecular weight resol resin (Comparative Example 3), a mixture of two kinds of high molecular weight resol resins (Comparative Example 4), and a mixture of low molecular resol resin and high molecular resol resin at a weight ratio of 90/10 (Comparative Example 5).

In the above-mentioned step, the time from the starting for the stirring of each of the mixtures to the termination of increase in the apparent volume by foaming was measured and the time is defined as the foaming-cure time for each of the foams. Further, the adhesion for the foams was evaluated as "X" in a case where defoliation was observed at the boundary between the veneer wood and the foams and as "o" for the case where no such defoliation was observed. The foam density was measured according to JIS A 9514. The results are shown in Table 1.

TABLE 1

| Formulation (parts) | Example | | | | Comparative Example | | | | |
|---|---|---|---|---|---|---|---|---|---|
| | 1 | 2 | 3 | 4 | 1 | 2 | 3 | 4 | 5 |
| Resol resin | | | | | | | | | |
| Low molecular weight A resol phenol resin B *1 | 30 | 15 | 25 | 40 | 100 | 30 70 | | | 90 |
| High molecular weight C resol phenol resin D *2 | 70 | 85 | 75 | 60 | | | 100 | 30 70 | 10 |
| Blowing agent *3 | 15 | 15 | 15 | 15 | 15 | 15 | 15 | 15 | 15 |
| Foam stabilizer *4 | 3 | 3 | 3 | 3 | 3 | 3 | 3 | 3 | 3 |
| Catalyst *5 | 15 | 15 | 15 | 15 | 15 | 15 | 15 | 15 | 15 |
| Result of evaluation | | | | | | | | | |
| Foam density (kg/m$^3$) | 25 | 29 | 41 | 36 | 20 | 21 | 63 | 45 | 25 |
| Adhesion | O | O | O | O | X | X | O | O | X |
| Foaming-cure time (sec) | 122 | 151 | 156 | 125 | 70 | 59 | 453 | 360 | 110 |

*1 A: phenol formaldehyde resin having number average molecular weight of 175 and viscosity of 3050 cp/25° C.
B: phenol formaldehyde resin having number average molecular weight of 165 and viscosity of 2500 cp/25° C.
*2 C: phenol formaldehyde resin having number average molecular weight of 260 and viscosity of 5000 cp/25° C.
B: phenol formaldehyde resin having number average molecular weight of 310 and viscosity of 13000 cp/25° C.
*3: trichlorotrifluoro ethane (F-113 manufactured by Asahi Glass Co.)
*4: Castor oil ethylene oxide adduct (F-140, manufactured by Daiichi Seiyaku Kogyo Co.)
*5: Aqueous 65% solution of phenol sulfonic acid (PS-65, manufactured by Daiichi Kogyo Seiyaku Co.)

From the results in Table 1, it was confirmed that although the foams prepared by blending only the low molecular weight resol resin (Comparative Example 1 and 2) and the foams in which the mixing ratio of the low molecular weight resol resin and the high molecular weight resol resin is out of the range of the present invention (Comparative Example 5) showed poor adhesion with the veneer board and the foams prepared by only the high molecular weight resol resin (Comparative Examples 3 and 4) required long foaming cure time, all of the foams obtained by the production process according to the present invention (Example 1-4) showed satisfactory adhesion and caused foaming cure in short period of time.

EXAMPLE 5 AND 6; COMPARATIVE EXAMPLES 6 AND 7

In accordance with the blending formulations in Table 2 ingredients E and F as the starting material for the rigid polyurethane foams were at first mixed and, under uniform stirring, sprayed and foamed on a plaster board of 500 mm×500 mm×7 mm by using a spray, to form rigid polyurethane foams. Then a uniform mixture comprising the ingredients G and H as the starting material for the phenol resin foams was prepared and the liquid mixture was sprayed and foamed on the rigid polyurethane foams described above to integrally mold foam materials to obtain a composite heat insulation material with 20 mm average thickness for each of the foams (Example 6).

Further, for the comparison, heat insulating material was formed by spraying only the starting material for the rigid polyurethane foams shown in Table 2 by twice using a spray to form the foams with 20 mm average thickness (Comparitive Example 6) and heat insulating material foamed by spraying only the starting material for the phenol resin foams shown in Table 1 by twice using a spray to form foams with 20 mm average thickness (Comparative Example 7), in the same method as described above.

The physical properties of the heat insulating materials were measured and evaluated.

For the physical properties, the foams density was measured according to JIS A 9514 and the combustion property was measured while putting the phenol resin foams on the side of a fired source. For the adhesion, vertical peeling test wad conducted to a test piece attached to 50 cm×50 cm plaster and indicated as "  " for excellent adhesion, "  " for satisfactory adhesion and "X" for poor adhesion.

The results are shown in Table 2.

TABLE 2

|  |  |  | Example | | Comparative Example | |
|---|---|---|---|---|---|---|
|  |  |  | 5 | 6 | 6 | 7 |
| Composition of starting material for rigid polyurethane foams (parts) | | | | | | |
| E | Polyol | BM-34 *1 | 50 | 50 | 50 | |
|  |  | BM-54 *2 | 50 | 50 | 50 | |
|  | TCEP *3 |  | 15 | 15 | 15 | |
|  | Fron F-11 *4 |  | 53 | 53 | 53 | |
|  | Catalyst | DABCO-33LV *5 | 1.2 | 1.2 | 1.2 | |
|  |  | DBTDL *6 | 0.5 | 0.5 | 0.5 | |
|  | SH-193 *7 |  | 1.5 | 1.5 | 1.5 | |
| F | Isocyanate | MR-100 *8 | 171.2 | 171.2 | 171.2 | |
|  |  | (NCO index) | (105) | (105) | (105) | |
| Composition of starting material for phenol resin foams (parts) | | | | | | |
| G | Resol resin | R-1 *9 | 25 | 25 |  | 25 |
|  |  | R-2 *10 | 75 | 75 |  | 75 |
|  | Fron F-113 *11 |  | 15 | 15 |  | 15 |
|  | F-140 *12 |  | 3 | 3 |  | 3 |
| H | PS-65 *13 |  | 15 | 15 |  | 15 |
| Foam thickness (mm) | | | | | | |
| Regid urethane foams |  |  | 10 | 20 | 20 | 0 |
| Phenol foams |  |  | 10 | 20 | 0 | 20 |
| Total thickness |  |  | 20 | 40 | 20 | 20 |
| Physical property | | | | | | |
| Foam density (kg/cm³) |  |  | 35 | 36 | 30 | 41 |
| Thermal conductivity (Kcal/mhr °C.) |  |  | 0.0203 | 0.0187 | 0.0178 | 0.0309 |
| Combustion property (A-A standard) |  |  | path | path | failed | failed |
| Adhesion |  |  |  |  |  |  |

*1 BM-34: Polyol (OH value 820), manufactured by Asahi denca Co.
*2 BM-54: Polyol (OH value 450), manufactured by Asahi denca Co.
*3 TCEP: tris($\beta$-chloroethyl)phosphate, manufactured by Daihachi Kagaku Co.
*4 Fron F-11: Trichloromonofluoromethan (manufactured by Asahi Glass Co.)
*5 DABCO-33LV: triethylenediamine/dipropylene glycol (weight ratio $\frac{1}{3}$) (manufactured by Sankyo Air products Co)
*6 DBTDL: dibutyl tin dilaurate (manufactured by Nitto Kasei Co.)
*7 SH-193: polydimethylsiloxane (manufactured by Toray Silicone Co.)
*8 MR-100: crude diphenylmethane-4,4'-diisocyanate (manufactured by Nippon Polyurethane Co.)
*9 R-1: low molecular weight resol type phenol resin (phenol formaldehyde resin) with number average molecular weight of 175 and viscosity of 3050 cp/25° C.
*10 R-2: low molecular weight resol type phenol resin (phenol formaldehyde resin) with number average molecular weight of 260 and viscosity of 5000 cp/25° C.
*11 F-113: trichlorotrifluoroethane (manufactured by Asahi Glass Co.)
*12 F-140: castor oil type surface active agent (manufactured by Daiichi Kogyo Seiyaku Co.)
*13 PS-65: aqueous 65% solution of phenol sulfonic acid (manufactured by Daiichi Kogyo Seiyaku Co.)

rigid polyurethane foams and phenol resin foams.

In the method as described above, the starting material for the rigid polyurethane foams and the starting material phenol resin foams were sprayed on the plaster board, each by once to obtain a composite heat insulating material with 10 mm average thickness for each of the foams (Example 5) and each by twice for both of the From the results shown in Table 2, it was confirmed that the heat insulating material comprising only of the rigid polyurethane foams (Comparative Example 6) showed low thermal conductivity and excellent thermal insulation property but poor combustion property and the heat insulating material comprising only the phenol resin foams (Comparative Example 7) showed good combustion property but high thermal conductivity and poor thermal insulation property. In comparison with them, composite thermal insulation materials prepared by integrally bonding the polyurethane foams and the phenol resin foams (Examples 5 and 6) were satisfactory both in the thermal insulation property and the combustion property and showed high adhesion with the plate materials.

What is claimed is:

1. A method for producing a phenol resin foam which comprises blending a resol phenol resin, a blowing agent and a catalyst; and foaming the resultant blend, said resol phenol resin comprising a mixture of a low molecular weight resol phenol resin with a number average molecular weight of less than 200 and a high molecular weight resol phenol resin with a number average molecular weight of greater than 200 are mixed at a weight ratio of from 5/95 to 80/20.

2. The method of claim 1 wherein said number average molecular weight of said low molecular weight resol phenol resin is from 150 to 180.

3. The method of claim 1 wherein said number average molecular weight of said high molecular weight resol phenol resin is from 250 to 450.

4. The method of claim 1 wherein said weight ratio of said low molecular weight resin and said high molecular weight resin is from 10/90 to 60/40.

5. The method of claim 1 wherein said blowing agent is blended in an amount of 5 to 50 parts by weight per 100 parts by weight of said resol phenol resin.

6. The method of claim 1 wherein said catalyst is blended in an amount of 5 to 70 parts by weight per 100 parts by weight of said resol phenol resin.

7. A phenol resin foam produced according to the method of claim 1.

* * * * *